July 14, 1959     F. H. RAYMOND ET AL     2,894,687
ELECTRIC ADDING AND SUBTRACTING DEVICES
Filed March 14, 1952     8 Sheets-Sheet 1

INVENTORS.
FRANÇOIS HENRI RAYMOND AND
ROGER ROBERT DUSSINE
BY Theodore Hafner
ATTORNEY

United States Patent Office 2,894,687
Patented July 14, 1959

2,894,687

ELECTRIC ADDING AND SUBTRACTING DEVICES

François Henri Raymond, Le Vesinet, and Roger Robert Dussine, Paris, France, assignors to Societe d'Electronique et d'Automatisme, Courbevoie, France Application March 14, 1952, Serial No. 276,602
Claims priority, application France March 17, 1951
8 Claims. (Cl. 235—176)

This invention relates to electric devices for adding to, or subtracting from, each other two quantities each represented in an electrical code by its expression in the form of the binary-scale series:

$$a_0 + 2a_1 + 2^2 a_2 + \ldots + 2^n a_n + \ldots$$

in which, when correctly expressed, the coefficients $a$ can of course have only one of two values, namely either 0 or 1. The code referred to consists of an electrical pulse train which reproduces the aforementioned binary-scale series in that it consists of $n$ equal code pulse periods (i.e. time intervals during which or positions in the train where, a pulse may be present to denote a coefficient $a$ of value 1 or absent to denote a coefficient $a$ of value 0), the code pulse periods denoting, by the sequence of their occurence, the successive terms of the binary-scale series arranged in ascending powers of the radix 2. In such an adding and subtracting device the two quantities are fed into the device in the form of two pulse trains of this kind respectively, which will herein be called the coded input trains.

The object of the present invention is to provide an improved electric adding and subtracting device which on receiving two coded input trains, without any limitation as to lengths or number of code pulse periods thereof, will produce a similarly coded output pulse train of the same periodicity as the coded input trains so that the coded output train represents the result of either addition or subtraction, depending on a simple manual or automatic setting of the device, such result being represented by the coded output train in its correct binary-scale expression, that is to say, with all carry-over operations effected.

In performing addition or subtraction, partial results may be formed consisting of quantities (or pulse trains representing such quantities) or digits (or pulses representing such digits), which are incorrectly expressed in the sense that they contain one or are digits of value equal to or higher than the radix 2, the carry-over not having been effected or completed; these will be herein called "uncorrected" and denoted, with other symbols, by the suffix "$b$," in contrast to that will be called "true result" or merely "result" quantities (trains) or digits (pulses), which have been reduced when necessary to less than radix value by carry-over, and which will be denoted, with other symbols, by the suffix "$n$."

When a numerical quantity B is added to, or subtracted from, a second numerical quantity A, the carried figures or "carries" taken together can obviously be regarded as forming a third numerical quantity R. In both addition and subtraction, this third quantity R must be considered, generally speaking, as having to be added systematically, term by term, to the quantity B.

In electric adding and subtracting devices of the kind specified the quantity R may be represented by a third coded pulse train (herein called the carry-over train) which is progressively produced in step with the progress of the operations performed on the individual terms or digits of the quantities B and A, and with the formation term by term of the coded output pulse which represents the net result of the adding or subtracting operation. For obtaining such a net result of operation, an addition $(A+B)$ and a subtraction $(A-B)$ can in fact be written $A+(B+R)_n$ and $A-(B+R)_n$, in which $(B+R)_n$ denotes that all carries have been completed when adding the quantities B and R, whether the digits of the quantity R be produced by the addition of digits of the two quantities B and R or by the addition or subtraction of digits of the two quantities A and $(B+R)_n$.

The suffix $a$ will herein be used to denote addition, and the suffix $s$ to denote subtraction; the absence of any such suffix after a symbol ordinarily to be associated therewith means that the symbol is used in a context applicable to either addition or subtraction.

In operations performed term by term on quantities expressed in the binary scale, the question as to whether a pulse (digit 1) or no pulse (digit 0) should appear in any given code pulse period of the coded output train and/or of the carry-over train (for carrying into the next code pulse period) can be decided in accordance with a small number of combinations, as only three digital values are to be considered, viz. 0, 1 and 2. The quantity A will be expressed only with the digital values 0 and 1, and likewise the quantity $(B+R)_n$. A simple rule of operation can be formulated for controlling or programming an addition or a subtraction of quantities represented by electric coded pulse trains. This rule of operation is quite independent of the actual configuration of the coded input trains B and A, and is given in the following table, in which:

The column $(B+R)_b$ denotes the possible digital values of the uncorrected result of addition of the quantities B and R;

The column $(B+R)_n$ denotes the possible digital values of the "net" result of addition of the quantities B and R;

The column A denotes the possible digital values of the quantity A;

The columns $S_a$ and $S_s$ respectively denote the possible digital values of the net results of the addition $A+(B+R)_n$ and of the subtraction $A-(B+R)_n$;

The columns $R_a$ and $R_s$ respectively denote the possible digital values of the overall carry quantities produced in the addition $A+(B+R)$ and the subtraction $A-(B+R)$;

The columns $R_{1a}$ and $R_{1s}$ respectively denote the possible digital values of the partial carries performed, in the addition $A+(B+R)$ and the subtraction $A-(B+R)$ by the addition of the quantities B and R;

The columns $R_{2a}$ and $R_{2s}$ respectively denote the possible digital values of the partial carries performed in the addition $A+(B+R)_n$ and in the subtraction $A-(B+R)_n$;

| | (B+R)_b | (B+R)_n | A | Addition | | | | Subtraction | | | |
|---|---|---|---|---|---|---|---|---|---|---|---|
| | | | | $S_a$ | $R_a$ | $R_{1a}$ | $R_{2a}$ | $S_s$ | $R_s$ | $R_{1s}$ | $R_{2s}$ |
| Digits | 0 | 0 | 0 | 0 | 0 | 0 | 0 | 0 | 0 | 0 | 0 |
| | 0 | 0 | 1 | 1 | 0 | 0 | 0 | 1 | 0 | 0 | 0 |
| | 1 | 1 | 0 | 1 | 0 | 0 | 0 | 1 | 1 | 0 | 1 |
| | 1 | 1 | 1 | 0 | 1 | 0 | 1 | 0 | 0 | 0 | 0 |
| | 2 | 0 | 0 | 0 | 1 | 1 | 0 | 0 | 1 | 1 | 0 |
| | 2 | 0 | 1 | 1 | 1 | 1 | 0 | 1 | 1 | 1 | 0 |

As will be apparent, the columns headed $S_a$ and $S_s$ are identical. Further, they reproduce the column headed A except in the two lines where $(B+R)=1$, the digits in the columns $S_a$ and $S_s$ being, for these two lines, the complements of the digital values in the column A, viz $S_a=S_s=1$ for $A=0$, and $S_a=S_s=0$ for $A=1$ when $(B+R)=1$.

The columns headed $R_a$ and $R_s$ are also identical except in the two lines where $(B+R)=1$. In these places, the digital values are complements of each other and they reproduce in the column $R_a$ the digital values of of column A and, in the column $R_s$ the complements of the digital values in the column A.

Further also, it is to be noted that the lack of agreement between the columns headed $R_a$ and $R_s$ in the lines where $(B+R)=1$, is due solely to the lack of agreement between the digital values of the partial carries $R_{2a}$ and $R_{2s}$. On the other hand, the partial carries in the columns headed $R_{1a}$ and $R_{1s}$ are the same.

An electric adding device is known, which consists in essence of two components known as half-adders (see for instance "Calculating Instruments and Machines" by D. R. Hartree, pages 100 seq. and particularly page 104). Each of the half-adders has two input terminals both connected to two circuits which may be referred to as "buffer means" and "gating means," respectively. Buffer means may be defined, in a restricted conception, as a circuit which, having applied thereto two coded pulse trains, delivers an output pulse only when in any one period a pulse is present in one but not both of the applied pulse trains; gating means, by contrast may be defined, in a restricted conception, as a circuit which having applied thereto two coded pulse trains, delivers an output pulse only when in any one pulse period a pulse is present in both the applied pulse trains.

In the known half-adder adding device, each half-adder has two output terminals from the so-called buffer means and from the so-called gating means respectively. To the input terminals of the first half-adder are applied the two coded input trains respectively whilst the two output terminals are respectively connected to the two input terminals of the second half-adder. At the buffer output terminal of the latter appears the coded output train representing the true result of the addition; the gating output terminal of the second half-adder is connected back to the channel connecting the gating output terminals of the second half-adder, the pulses from the gating output terminals of both half-adders having to pass through a delay element on their way to the input terminal of the second half-adder, whereby they are delayed by a time equal to one code pulse period.

This adding device can also be used as a subtracting device by converting the coded pulse train representing the subtrahend into a coded input train representing the complement of the subtrahend for addition with one other coded input train.

An electric adding and subtracting device according to the present invention likewise comprises two half-adders, each having buffer and gating means such as defined, two input terminals to both said buffer means, for delivering a result coded train, and an output terminal from said gating means, for delivering a carry coded train, and the invention is characterized in that one of said input terminals of each half-adder is provided with means for applying thereto the two coded input trains respectively, and said result output terminal from the first half-adder is connected to the other of said input terminals of the second half-adder while said carry output terminals of both half-adders are jointly connected, via delaying means, to the other of said input terminals of said first half-adder, said result output terminal of the second half-adder being adapted to deliver a coded output train from the device.

Further, said gating means of said second half-adder includes means for producing a gated pulse train appropriate to an operation of addition of the quantities represented by this coded input trains and means are also provided in said second half-adder for producing a gated pulse train appropriate to an operation of subtraction of one of said quantities from the other, switching means being further provided which are adapted to select the one or the other of said gated pulse trains for delivery to said carry output terminal of said second half-adder.

In order to enable the invention to be readily carried into effect, a few embodiments thereof will now be described by way of example with reference to the accompanying drawings, wherein.

In all figures like elements are, as far as possible, designated by the same reference numerals.

In all embodiments, $\theta$ will denote the time interval of a pulse period of the concerned code.

Figure 1:
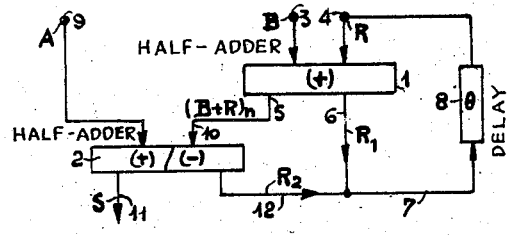
Fig. 1 is a block schematic diagram showing the general arrangement of an adding and subtracting device embodying the invention.

The operation of the device of Fig. 1 will now be described by means of a numerical example (quantity $A=53$; quantity $B=27$) with reference to Fig. 2. In this example it will be assumed that the transmission delays within the two half-adders 1 and 2 are nil. At the terminal 9, the configuration of the coded input train is as shown in line A of Fig. 2, and read from left to right, it is apparent that the numerical quantity A is expressed in the binary scale as 1010110. The coded input train A is applied with its code pulse periods arranged in ascending powers of 2. At the terminal 3 there is applied the coded input train B, which represents the quantity B expressed in the binary scale as 1101100, with its code B pulse periods likewise appearing in the order of ascending powers of 2.

With the operator 2 set to enable the device to act as an adder, the overall delayed carry-over pulse train is as shown at $R_a$ and reads 0111111, at the input terminal 4. The mixing of both the B and $R_a$ pulse trains at the input side of the first operator 1 represents the uncorrected result $(B+R)_b$ which reads 1212211. The unit value pulses are segregated for the constitution of the net partial result $(B+R_a)_n$ at the terminal 5, which reads 1010011, whereas the double value pulses which are cancelled in the output train are uniformly reduced to unit value and after being delayed by $\theta$ appear at the input terminal 4 as carry $R_{1a}$ which reads 001011.

The second operator 2 simultaneously receives the coded input train A and the coded partial result train $(B+R)n$, and the coincidence of their pulses produce a train reading 2020121. Here too, by the cancellation of the digits 2 in the output 11, results in an output train $S_a$ reading 0000101 in the binary radix numeration, i.e. reading 80, in the denary radix numeration being the correct sum of 53 and 27. Simultaneously, at the other output 12 of operator 2, the carries produce a second carry train $R_{2a}$ which, after a delay of $\theta$, is applied to the input terminal 4 of operator 1 with other configuration 0101001.

It will be apparent that the overall carry train $R_a$ is merely the sum of the partial carry trains $R_{1a}$ and $R_{2a}$, and it is quite easy to check that in no event can coincidence be obtained between the discrete pulses of said partial carry trains.

It will also be seen that the various trains and series of pulses are obtained in conformity of the preceding table. Now for a subtraction process between the coded input trains A and B, the overall carry-over pulse train, $R_S$, is configuration 0010110 and, combined with the coded input train B, the uncorrected result of addition $(B+R_S)_b$ reads 111121. The output train from the terminal 5 of the first operator 1, $(B+R_s)_n$, reads 111101 and the partial carry train from terminal 6 and delayed by $\theta$ reads $R_{1s}=000001$, upon its application to the input terminal 4. In the second operator 2, now set for subtraction, the output net result train $S_S$ presents the code 01011, the value of which in denary scale is 26, (53—27), and the partial carry train $R_{2s}$ reads 00101 upon its application on the input terminal 4 of the first operator 1. Here again, the overall carry-over train $R_S$ results from the mixing of the two partial carry trains $R_{1s}$ and $R_{2s}$, without any coincidence in time of the pulses of one with the pulses of the other of the partial carry trains.

Figure 2:
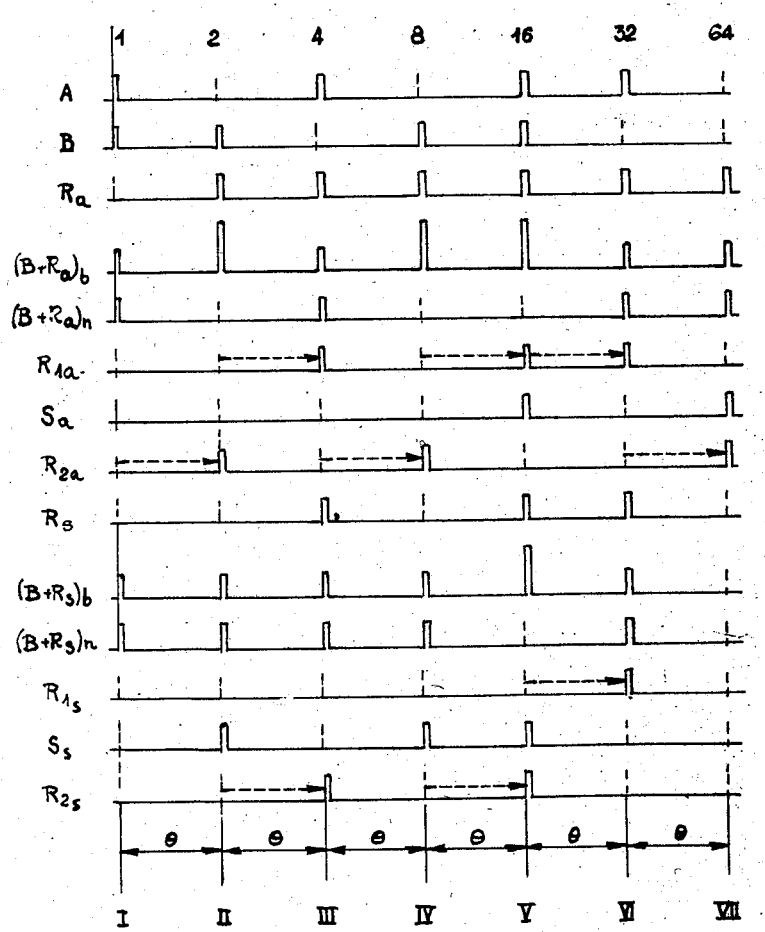
Fig. 2 is an explanatory pulse train diagram graphically illustrating, by reference to a numerical example, the operation of the device of Fig. 1, both as an adder and as an adder and as a subtractor.

The pulse graphs of Fig. 2 which corresponds to partial operators or half-adders 1 and 2 having no internal transmission delays, are also valid for partial operators or half-adders 1 and 2 having internal transmission delays of less than $\theta$. This means that, in practice, the coded pulse trains can be set at relative phase shifts without this causing any difference, provided the phase difference remains less than the code pulse period $\theta$.

The following embodiments will give examples of adder-subtractor devices according to the invention in some of which the component circuits are so chosen as to impart phase shifts of this kind to the coded input trains and to the series of pulses which formed during the operation process, while in others no such phase shift takes place.

In these embodiments, use will be made of an additional series of pulses, continually supplied for the control of the operation from a general program circuit of the computer of which the device forms part; these pulses will be called timing pulses and they occur at the frequency of the code pulse period $\theta$. Such timing pulses will be mainly used for reshaping the incoming pulses and for deriving pulses from static storage or register means included in the partial operators.

Figure 3:
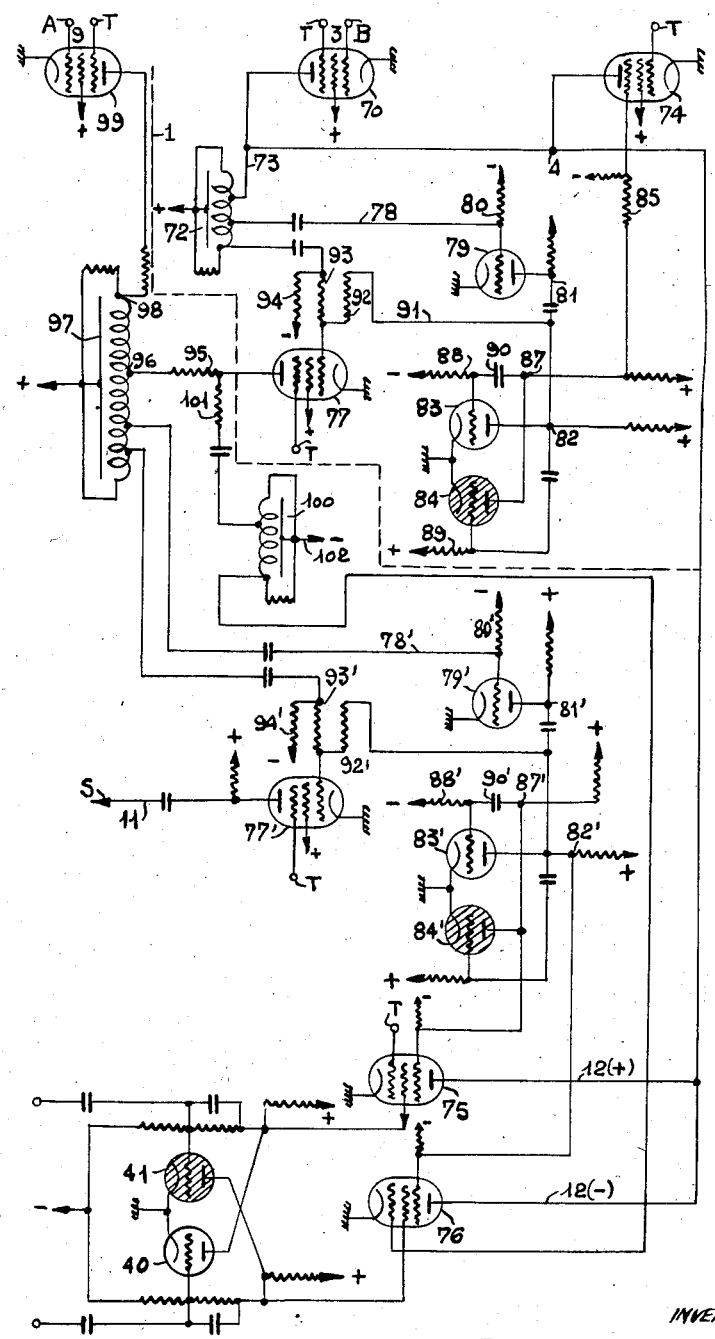
Figs. 3 to 9 are circuit diagrams showing respectively seven forms of electronic lay-out for a device according to the invention.

Referring to Fig. 3, the coded input train B is applied on the control grid of a tube 70 the third or suppressor grid of which receives the timing pulses T. The plate output of tube 70 is common to both tubes 70 and 74. The latter receives on its control grid the timing pulses T and on its suppressor grid the partial carry pulses $R_1$. This plate output is also common to two other tubes 75 and 76 which respectively deliver the addition partial carry pulses $R_{2a}$ and the subtraction, partial carry pulses $R_{2s}$ from the second operator circuit. Only one of these last tubes 75 and 76 is operative at a time, depending upon whether the circuit is set for addition or subtraction such setting being effected by the condition of a bistable trigger stage 40—41, the plate outputs of which respectively control the screen grids of tubes 75 and 76. In the condition of trigger stage 40—41 indicated in the drawing, where tube 41 is conductive, tube 75 is operative and the device acts as an adder circuit. The application of a trigger pulse for instance of negative polarity to the control grid of tube 40 will reverse the conditions and the device will then act as a subtractor.

The plate output common to all tubes 70, 74, 75 and 76 is connected to the input tap 73 of a delay line 72, such as an artificial electromagnetic delay network of well-known kind. Delay line 72 is terminated at one end on a short-circuit and at its other end on its characteristic impedance so that the pulses issuing from the delay line comprise two component pulses of opposite polarities. The total electrical length of delay line 72 for a pulse going first to the short-circuited end and then returning with its polarity reversed to the output tap at the other end is made equal to $\theta$, length of time interval of a pulse period. When negative pulses are applied at 73, positive pulse components will appear a time $\theta$ later on the input resistor 93 of the output tube 77 of the first operator circuit, in phase coincidence with the timing pulses T applied on suppressor grid of tube 77 with a delay $\theta$.

From an intermediary tap of delay line 72, connection 78 applies the signals to the control grid of a tube 79. This tube 79 is so biassed by grid bias resistor 80 that it transmits only the pulses which are of an amplitude equal to twice the unit amplitude, the latter being the amplitude of any pulse issuing from any of the tubes 70, 74, 75 and 76 feeding delay line 72. The plate resistor and voltage of tube 79 are further chosen so as to limit the amplitude of the transmitted pulses. Tube 79 acts as an amplitude discriminator delivering an output pulse only when it receives on its control grid a pulse resulting from the coincidence in time of at least two component pulses.

Output lead 81 of tube 79 is connected to a plate actuation input of a monostable trigger stage, or univibrator 83—84. This univibrator circuit is such that in its normal rest condition, tube 74 is off since the plate of tube 84 of the univibrator is connected through resistor 85 to the suppressor grid of tube 74. The timing pulses T on the control grid of tube 74 are not transmitted to the common plate output 4, which effectively forms the terminal of the first operator circuit for the application of carry-over pulses. On the other hand, when the univibrator stage is at work, tube 84 is off and tube 74 is on, and the timing pulses will be delivered to delay line 72. This condition occurs whenever, during any code pulse period, there appears a pulse in the delay line 72 from the terminal 3 (train B) and simultaneously a pulse appears from the terminal 4 (train R). After being triggered to the working condition the univibrator spontaneously returns to rest. The time constant of the monostable trigger stage 83—84 is such as to enable the next timing pulse occurring in the pulse period which immediately follows the pulse period at which a combined B and R pulse enters the delay line at 73, to pass through tube 74 and to reach the input 73 of this delay line. The configuration shown for this univibrator stage is quite conventional; control grid of tube 83 is negatively biased at 88, control grid of tube 84 is positively biased at 89; both cathodes are on ground; there is a capacitive coupling connection from the plate lead 82 of tube 83 to the control grid of tube 84, and a corresponding capacitive coupling connection 90 from the plate 87 of tube 84 to the control grid of tube 83. Other circuits may be used for this purpose without departing from the scope of this disclosure.

From the output of tube 79, a lead 91 reaches an input resistor 92, so that the plate voltage of tube 79 is applied to the control grid of output tube 77 of the first operator and the plate voltage from 83 counteracts the negative bias at 94, so that any incoming pulse through resistor 93 is transmitted in positive polarity to the control grid of tube 77. Such pulse will pass to the output of tube 77, since it is in phase with the timing pulse T on the suppressor grid. On the other hand, if tube 83 of the trigger stage is on, i.e. if such trigger stage is at work, a double unit pulse having been applied on the control grid of the amplitude discriminating tube 79, the incoming pulse at 93 is not transmitted through the tube 77 since the control grid thereof has too much negative bias. It will be seen therefore that the amplitude discriminator 79 in conjunction with the mono-stable trigger circuit 83, 84 provides a means of registering or storing pulses of the uncorrected train $(B+R)_b$ and thereby controlling tube 77 and tube 74, the former acting as a means for performing the logical function of restricted union and delivering the net partial result train $(B+R)_n$, while the latter acts as a gating means and delivers the partial carry train $R_1$.

The corrected coded train $(B+R)_n$ issuing from tube 77 is firstly applied through a separating resistor 95 to the input terminal or tap 96 of a delay line 97. Delay line 97 comprises an inductance-and-capacitance artificial network and as matching resistance, and at its other end on a short-circuit. Constitution and operation of network 97 resembles those of delay line 72 of the first partial operator, but presents a first section of electrical length $\theta$ between its input tap 98 and output tap 96 to which is applied the coded train $(B+R)_n$. On the input tap 98 there is applied the second coded input train A the electric pulses of which have been reshaped in the input stage 99 by means of the above-mentioned timing pulses T. Reshaping stage 99 resembles shaping stage 70 for coded input train B. Delay line 97, apart from playing a part similar to that of delay line 72 in the first operator circuit, also insures the mixing of the pulses in both coded trains A and $(B+R)_n$. The terminal short-circuit is preferably established on the output side of delay line 97.

The second half-adder has a portion serving for addition which is similar to the circuit of the first, as indicated by the reference numerals which are the same in this portion of the second half-adder as those of the corresponding elements of the first half-adder, with the addition of the marks (') distinguishing the corresponding elements in the second half-adder. The coded output train S representing the final result of the operation appears at the terminal 11 from the plate of the tube 77'. The carry forming stage 75 in the second half-adder plays the very part of the carry forming stage 74 in the first half-adder, as tube 75 is controlled by the monostable trigger circuit 83'—84' in the same way as tube 74 is controlled by the monostable trigger circuit 83—84. When, however, the second half-adder is set to make the device act as a subtracting circuit instead of an adding circuit, the carry forming stage 75 is rendered inoperative and a subtraction carry forming stage 76 is substituted therefor. The switching into operation of the one or the other of carry forming tubes 75 and 76 is effected by means of a bistable trigger stage 40—41, acting back on the screen grids of both tubes 75 and 76 so that one of these tubes is on when the other is off, as already described.

The control grid of carry forming tube 76 permanently receives the coded train $(B+R)_n$ issuing from output tube 77 of the first operator circuit, but delayed by $\theta$ by means of a delay line 100, of the same electrical constitution and characteristics as the delay line 72 in the first operator. Its input tap receives the coded train $(B+R)_n$ through a resistor 101, and the negative bias potential is applied at 102 for biasing the control grid of tube 76.

In a subtraction operation, the $R_{2s}$ train from tube 76 must have a pulse for every pulse of the net partial result train $(B+R)_n$ except when a pulse is simultaneously present in the coded input train A. When this occurs, in the present embodiment, a double-unit amplitude pulse is formed at the output end of the delay line 97, and the amplitude discriminator 79' has triggered the univibrator 83'—84' to its working condition before a pulse from the $(B+R)_n$ train has been applied to the control grid of the tube 76. Use is made of this fact to control the formation of the subtraction carry pulses $R_{2s}$, by controlling the suppressor grid of the tube 76 from the plate potential of the tube 83' of the univibrator. When the latter is at work, its tube 83' is on and the D.C. bias on the suppressor grid of the subtraction carry-forming tube 76 will be so low as to cut the tube 76 off and prevent any pulses applied to its control grid from reaching its plate.

In the second operator circuit of Fig. 3, a dual control of both carry forming tubes 75 and 76 is thus insured, viz. a control of the operation proper, addition or subtraction, exerted on their screen grids from the trigger circuit 40—41; and a carry forming control proper from the monostable trigger circuit 83'—84'.

Figure 4:
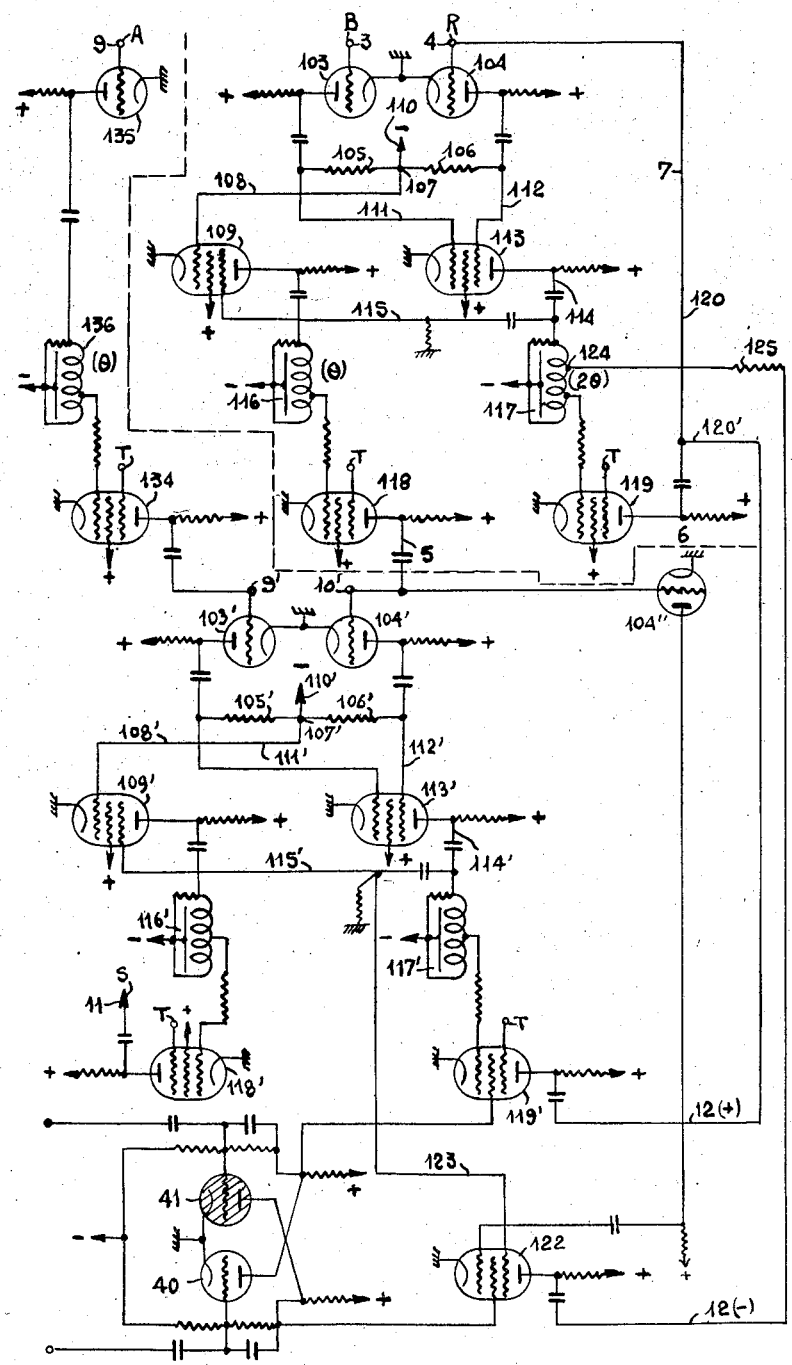

An alternative of the computer circuit of Fig. 3 is given in Fig. 4. In this embodiment, both the coded trains B and R are applied in negative polarity of pulses in the control grids of the respective tubes 103 and 104. The plate outputs of these tubes are connected respectively to the ends of a resistor mixer network 105—106 the electrical mid-point 107 of which is connected through D.C. connection 108 to the control grid of a gate tube 109. The negative bias for the control grid is applied at 110 to mid-point 107. The plate outputs of the tubes 103 and 104 are further connected respectively by D.C. connections 111 and 112 to the control and suppressor grids of a tube 113. In this way tube 113 will operate as a coincidence detector stage, delivering the partial carry pulses $R_1$. From the plate output 114 of tube 113, a connection 115 extends back to the suppressor grid of tube 109 so that whenever an output $R_1$ pulse issues from tube 113, with negative polarity, tube 109 is cut off and delivers no output pulse. Tube 109 thus delivers coded train $(B+R)_n$.

The two trains $(B+R)_n$ and $R_1$ issuing from the first operator circuits are applied respectively to input taps of two delay lines 116 and 117. These delay lines are similar in constitution and operation to those previously shown in Fig. 3, but delay line 116 has an electrical length of $\theta$, from its input terminal to the other short-circuited end and back to its output tap (with reversed polarity of pulses); delay line 117 has a similar electrical length of $2\theta$. The carry pulse train $R_1$ is thus delayed by $\theta$ with respect to the $(B+R)_n$ pulse train. The output taps of delay lines 116 and 117 are connected to the control grids of the tubes 118 and 119 acting pulse reshaping output stages for the first operator circuit, by virtue of the timing pulse T applied to their suppressor grids. Through a connection 120, the output of tube 119 is fed back to the input terminal 4 of the first operator circuit.

The plate output of the reshaping tube 118 is connected to the input terminal 10' of the second operator circuit, the other input terminal 9' of which receives the coded train A which has been delayed by $\theta$ from its instant of application at 9 in a circuit comprising a polarity inverter tube 135 followed by a delay line 136 and a reshaping stage 134.

The second operator circuit is, for an addition, similar in principle to the first as is apparent from the choice of identical reference numerals, having merely the addition of mark (') for the corresponding elements of the second operator. However, the carry output tube 119' can be blocked by control trigger stage 40—41 when a subtraction operation is required, so that the carry pulses corresponding to an addition cannot reach the feedback circuit. Further, the delay line 117' of the second half-adder is made equal to $\theta$ and not to $2\theta$ as for delay line 117 in the first half-adder.

The partial carry pulses for a subtraction operation are in this embodiment derived from a comparison of the output train $(B+R)_n$ from the first operator circuit with the addition carry pulse train $R_{2a}$ which is always available at the terminal 114'. After polarity reversal in tube 104", the pulse train $(B+R)_n$ is applied to the control grid of the subtraction carry forming tube 122. The addition carry pulses $R_{2a}$ from point 114' are applied by connection 123 to the suppressor grid of tube 122. Tube 122 only transmits those pulses of the train $(B+R)_n$ which do not coincide with pulses of train $R_{2a}$. One can see from the table hereinbefore set that those of the pulses from the $(B+R)_n$ coded train which will be thus transmitted to the carry-over input terminal, will in fact be those for which no corresponding pulses exist in the coded train A.

The pulses which thus appear at the plate of tube 122 are of negative polarity and are due to be delayed by $\theta$ before their reinjection on the terminal 4 of the first operator circuit. For the sake of economy, the subtraction carry pulses are applied to an intermediary tap 124 of the delay line 117, through a resistor 125. The tap 124 is so arranged as to provide a delay of $\theta$ for the carry pulses which are introduced at this point, and are reflected back from the short-circuited end to the control grid of tube 119.

It is to be noted that, in the device of Fig. 4 the coded train S output appearing at the plate of tube 118' is shifted by $\theta$ with respect to the coded input trains as well as in the case of the circuit of Fig. 3. Such a phase-shift can be avoided, if desired.

Figure 5:
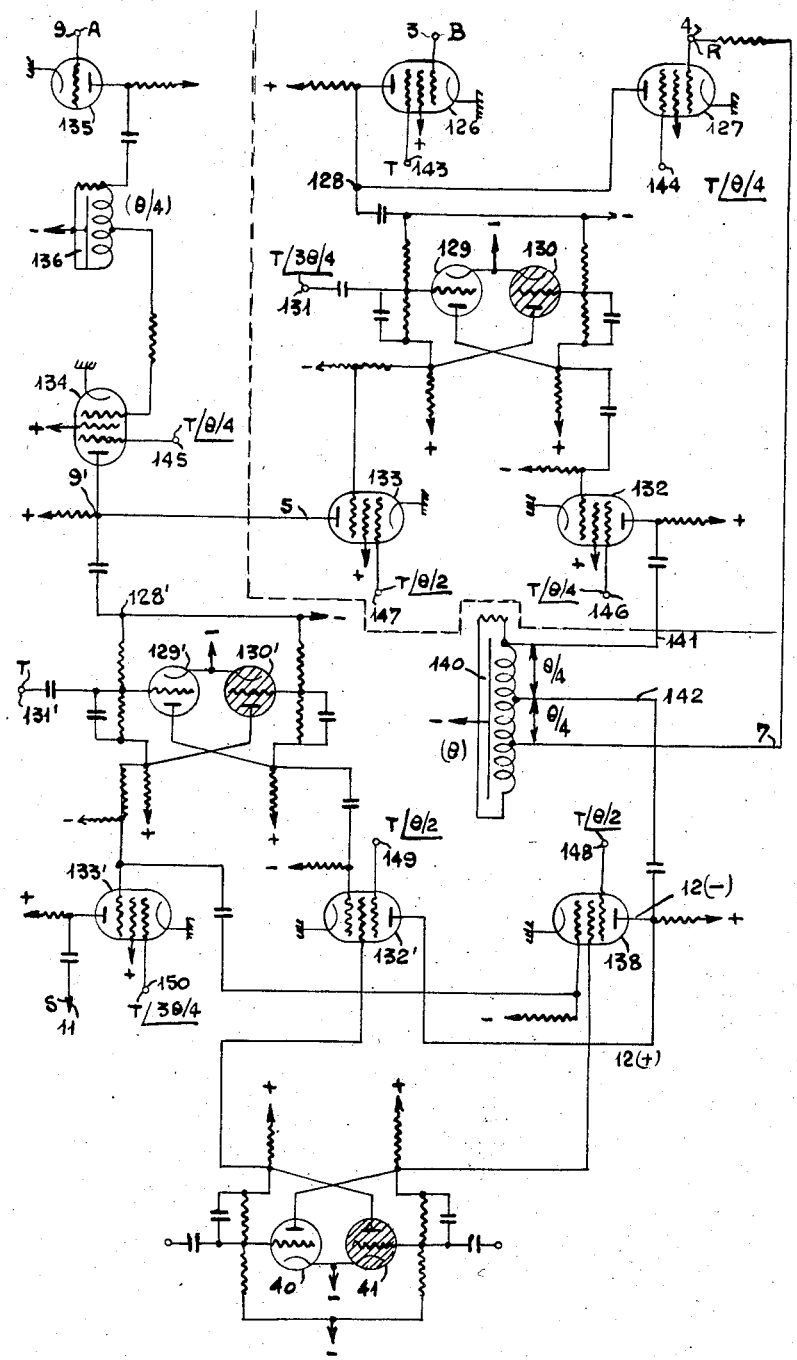

In the alternative embodiment of Fig. 5, both first and second operator circuits are so designed as to require a predetermined permanent phase shift between the two incoming pulse trains. In each operator circuit, operations are performed by the use of a bistable trigger stage. Illustrative values of phase shifts between coded trains, and between corresponding timing pulses used in operative relation to these coded trains, for reshaping and reset, will be mentioned, it being understood, however, that such values may be varied, if desired.

The input terminals 3 and 4 for the B and R trains respectively of the first operator circuit are connected to the control grids of two tubes 126 and 127 receiving the timing pulses T on their suppressor grids from terminal 143 and 144 so as to reshape the incoming pulses in shape, duration and frequency. The plate outputs of both tubes 126 and 127 are connected to a common actuation terminal 128 of a trigger stage comprising two tubes 129 and 130 coupled in the usual manner by reciprocal plate-to-grid connections including time constant networks. The rest condition of the bistable trigger stage will be assumed to be the one in which tube 130 is on and tube 129 is off. The control grid of tube 129 is further provided with an asymmetrical actuation input 131, receiving the timing pulses T shifted by a delay $3\theta/4$, for instance, for insuring the resetting to rest of this trigger stage at each code pulse period; these timing pulses shifted by $3\theta/4$ are applied with negative polarity to the terminal 131, whereas the other series of timing pulses used in the embodiment of Fig. 5 are applied with positive polarity. The output plate circuit of tube 129 is connected through a series capacitor to the control grid of a tube 132, for the selection of the carry pulses $R_1$ of the first operator circuit. Tube 132 is only operative during the instants of application to its suppressor grid, from the terminal 146 of the timing pulses shifted in phase $\theta/4$. The plate output of tube 130 of the trigger stage is connected by a D.C. connection to the suppressor grid of a tube 133 which is thus operative only when tube 130 is off (work condition of the trigger stage). Tube 133 receives on its control grid the permanent series of positive timing pulses T shifted by $\theta/2$.

The timing pulses which will be thus transmitted through the output tube 133 of the first operator circuit will apparently represent the coded output train $(B+R)_n$ of the first operator circuit. These pulses will be applied at the point 128' of the second operator circuit which also receives the pulses of the coded input train A, arriving at the control grid of an inverter tube 135, delayed by $\theta/4$ in a delay line 136 and reshaped in a tube 134 by means of the timing pulses T shifted by $\theta/4$ applied with positive polarity to the suppressor grid of tube 134 from terminal 145.

Point 128' is the symmetrical actuation input terminal of a trigger stage 129'–130', of the conventional bi-stable kind, included in the second operator circuit of Fig. 5. The circuit arrangement of the latter is apparently similar to that of the first, the corresponding component elements being denoted by the same reference numerals as those of the first operation but marked ('). Tube 130' of this trigger stage is on in the rest condition of this stage and its plate output is connected by a D.C. connection to the suppressor grid of an output tube 133' which receives on its control grid from terminal 150 the timing pulses T shifted by $3\theta/4$. The other tube 129' of the second trigger stage has its plate output connected by an A.C. connection to the control grid of carry forming tube 132' the suppressor grid of which receives the timing pulses shifted by $\theta/2$ and from terminal 149 while its screen grid is controlled by the plate voltage of tube 41 of trigger stage 40–41 which, as in the previous embodiments is again provided in order to determine whether addition or subtraction is to be performed. Tube 132' is so controlled by trigger stage 40–41 as to be operative only when an addition is to be performed and the output lead 12 (+) of tube 132' is used for the transmission of the addition carries $R_{2a}$.

Trigger stage 129'–130' is provided with an asymmetrical resetting actuation input at 131' which receives the unshifted timing pulses T, with negative polarity.

Subtraction carries $R_{2s}$ are generated, when the control trigger stage 40–41 is at rest, by a tube 138 which has its screen grid controlled by tube 40, and the suppressor grid of which receives the timing pulses shifted by $\theta/2$ from terminal 148 while its control grid is connected by a capacitive connection to the plate output of tube 130' of trigger stage 130'–129' of the second operator circuit. As apparent from the table hereinbefore set, in a subtraction operation, a subtraction carry pulse will be generated whenever an output pulse appears in the subtraction $A-(B+R)_n$ proper.

The plate output of tube 132 is connected to the input tap of a delay line 140 so designed that the pulses applied thereto by tube 132 are transmitted after polarity reversal to the control grid of the input carry-over tube 127 with a delay equal to $\theta$ at their application at 141 on the input tap of delay line 140. The plate outputs of both tubes 132' and 138 are connected by the lead 142 to an intermediary input tap of the same delay line 140. This intermediary tap is spaced by an electrical length of $\theta/4$ from the input tap connected to the output of tube 132. In the example given in Fig. 5, delay line $\theta$ comprises three sections, each of $\theta/4$, the first terminated on the characteristic of matching resistance of the artificial line and the third terminated on a short-circuit so that the total delay in this third section is $\theta/2$, the polarity reversal being effected by this short-circuit.

To recapitulate: the timing pulses are applied in phase with coded input trains A and B to terminals 143 and 131'; with a phase lag of $\theta/4$ to terminals 144, 145 and 146; with a phase lag of $\theta/2$ to terminals 147, 148 and 149; and with a phase lag of $3\theta/4$ to terminals 131 and 150. With such values of phase shifts, the output pulses in the coded result train S at 11 will lag by $3\theta/4$ behind the coded input trains A and B; a lag of $\theta$ could be easily obtained by applying to terminal 150 timing pulses in phase with coded input trains A and B, but the resetting timing pulses applied to terminal 131' should then be spaced in time slightly behind the pulses at 150, for instance with a delay of $\theta/5$.

The operation of the computer arrangement of Fig. 5 may be described as follows (omitting this time the operation of the delay lines and reshaping stages):

In the general rest condition, the coded input trains A and B (assumed by way of example to be of the respective configurations shown in Fig. 2) are simultaneously applied to the input terminals 9 and 3 respectively.

The pulse existing in input train B in the first pulse period sets to work the trigger stage in the first operator circuit and the tube 130 of this trigger stage is turned off, while the tube 129 is turned on. The resulting negative output pulse from tube 129 has no action on the tube 132. The plate potential of tube 130 unblocks output tube 133. Such actuation occurs at the zero instant of the first code pulse period. At the instant $\theta/4$ of this first pulse period, the pulse existing in the coded input train A reaches the actuation input of trigger stage 129'—130' of the second operator circuit. This trigger circuit comes to work, while tube 130' is off and tube 129' on. The negative plate output from tube 129' has no action on tube 132', and the positive pulse from tube 130' has no action on tube 138. One only of tubes 132' and 138 is operative and, considering first of all an operation of addition, tube 138 is permanently rendered non-conductive by the low bias potential of its screen grid.

Also, at the instant $\theta/4$ of the first code pulse period tube 132 has received a timing pulse on its suppressor grid, but as no signal then exists on its control grid, no pulse is delivered by tube 132.

At the instant $\theta/2$ of the first code pulse period, both tubes 133 and 132' receive a timing pulse. Tube 133 delivers an output pulse which restores trigger stage 129'—130' to rest; a positive pulse from 129' is applied to tube 132' and a carry pulse is delivered to delay line 140.

At the instant $3\theta/4$ of the first code pulse period, tube 133' receives a timing pulse but being held non-conductive by tube 130', which is on, no output pulse is delivered to terminal 11.

Also, at the same instant $3\theta/4$, stage 129—130 in the first operator circuit is reset to rest. The pulses delivered by its tubes upon being reset, have no action on the tubes 132 and 133, respectively.

At the zero instant of the second code pulse period the rest condition of trigger stage 129'—130' is merely confirmed by the reset pulse, and simultaneously trigger stage 129—130 is actuated to work by the pulse existing at that instant in the coded input train B.

At the instant $\theta/4$ of this second code pulse period, the previously formed partial carry pulse $R_{2a}$ is fed back from the output of the delay line 140 to the grid of tube 140 which delivers an actuation pulse resetting to rest trigger stage 129—130; tube 129 delivers a positive pulse to the control grid of tube 132, and a carry pulse $R_{1a}$ is thus applied to the input tap of delay line 140 since tube 132 is at this instant rendered operative by a pulse applied via 144 to its suppressor grid. This carry pulse will be delayed by $\theta$ so that it will not reach the grid of tube 127 until the instant $\theta/4$ of the third code pulse period.

Also, at the instant of $\theta/4$ of this second code pulse period tube 133 is rendered inoperative by 130 so that no pulse is transmitted to the second operator circuit which, at that instant does not receive a discrete pulse from the input of coded train A. No output pulse is thus delivered at 11 in the second code pulse period.

The process continues until the addition operation is completed. For instance, in the fifth code pulse period wherein three pulses exist, namely one in each of the trains A, B and R (see Fig. 2), it is clear that the consecutive application of the pulses of the B and R trains to the first operator ciruit results in a partial carry pulse being delivered to tube 132, but no pulse is transmitted to the second operator circuit which however has received a pulse of the coded input train A; tube 133' will thus deliver a result pulse at the instant $3\theta/4$ of this fifth code pulse period, when a timing pulse is applied to its control grid at 150.

To take another example, in the last code pulse period of the operation, a single carry-over pulse exists at the instant $\theta/4$ and thus an output pulse will be delivered to terminal 11 from tube 133' at the instant $3\theta/4$ to form a pulse in the coded output train S.

For a subtraction operation the only change is in the generation of the carry pulses in the second operator circuit. Tube 132' of the second operator circuit is unoperative but tube 138 is operative. Considering again the beginning of the subtraction operation of Fig. 2, i.e. with the same coded input trains A and B, at the instant $\theta/2$ of the first code pulse period trigger stage 129'—130' is reset to rest; tube 130' thus delivers a negative pulse and this pulse has no action on tube 138. No partial-carry pulse $R_{2s}$ is produced when in any one code pulse period a pulse is present in the trains B and A (but not in the train R) or in the trains R and A (but not in the train B).

In the second code pulse period, however, the trigger stage 129'—130' which was at rest, since no pulse exists in coded train A, is brought to work at the instant $\theta/2$ by a pulse from coded input train B having been applied to trigger stage 129—130 at the instant zero of the second code pulse period. No carry-over pulse is fed back in this code pulse period. With tube 130' off, a positive pulse is delivered to carry forming tube 138. Further tube 133' thereby is rendered operative and at the instant $3\theta/4$ of this second pulse period the timing pulse applied at 150 is transmitted to the output terminal 11 to form a pulse in the coded output train S.

In the embodiments of Figs. 6 to 9, inclusive, which will now be described, the first operator circuit is similar to that shown in Fig. 5. Input tubes 126 and 127 are respectively rendered operative at the zero and $\theta/4$ instants of each code pulse period and the plate outputs of these tubes are jointly connected to the actuation point 128 of the first operator trigger stage 129—130 in which the tube 130 is conductive at rest; trigger stage 129—130 is reset by pulses applied at 131 at the instant $3\theta/4$ in each code pulse period; the carry forming tube 132 is made operative at the instant $\theta/4$ of each code pulse period and the operativeness of output tube 133 is under the control of tube 130 of the first trigger stage. In the second operator circuit the delayed input channel for coded train A is retained but the length of delay imparted thereby to the pulses is made equal to $\theta/2$ (instead of $\theta/4$ as in Fig. 5) and the phase shift of the timing pulses at terminal 145 of tube 134 is also made equal to $\theta/2$. The complete feed-back channel for the carry pulses is also retained and the carry-over pulses, if any, are re-applied to terminal 4 at the instant $\theta/4$ in each code pulse period.

The partial carry pulses from the second operator circuit will also be derived at the instants $\theta/2$ of each code pulse period. The operating condition of tubes 138 and 132', for subtraction and addition respectively is determined by the condition of trigger stage 40—41, as in the preceding embodiments.

Figure 6:
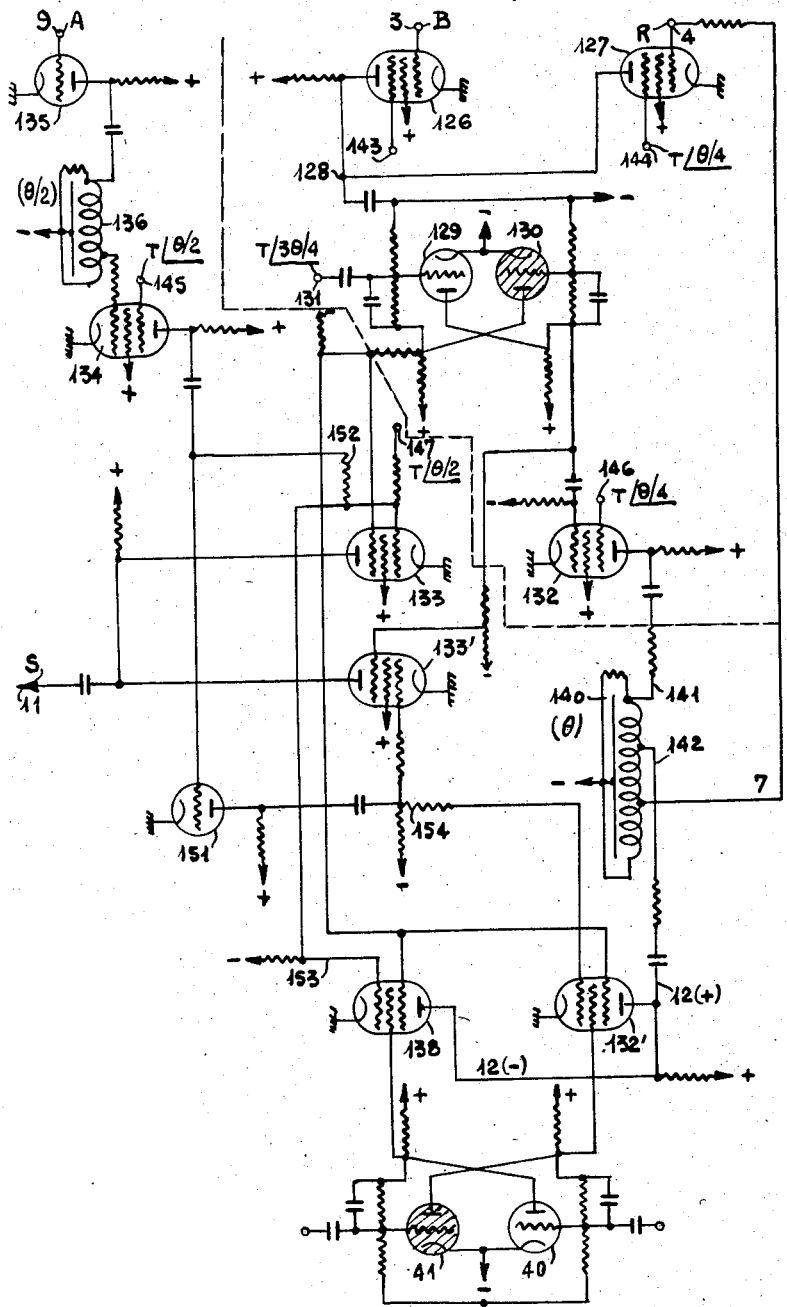

Referring now to Fig. 6, the second operator circuit comprises an output tube 133' the suppressor grid of which is connected by a D.C. connection to the plate output of tube 129 of the trigger stage in the first operator circuit so that tube 133' is only operative when, between the instants $\theta/4$ and $3\theta/4$, the bistable trigger stage 129—130 is at rest, viz. the quantity $(B+R)_n$ is zero (no pulse present). In such a case, any pulse from the coded input train A which reaches the control grid of tube 133', with positive polarity inverter stage 151 being connected to the output of re-shaping tube 134, is passed to the output channel 11 at the instant $\theta/2$ of a code pulse period. On the other hand, if trigger stage 129—130 is at work $(B+R)_n=1$, output tube 133' is inoperative.

As tube 133' only delivers an output pulse when $A=1$ and $(B+R)_n=0$, another output stage must be provided for the case where $A=0$ and $(B+R)_n=1$. This is obtained by mixing in the control grid lead of tube 133, positive timing pulses applied at 147 in a phase shift of $\theta/2$ with the negative pulses of the coded input train A coming from tube 134 with the same $\theta/2$ phase shift and applied to the control grid of the tube 133 through a mixing resistor 152. If a negative A pulse coexists with a positive timing pulse at 147, no pulse will be appearing at the plate of tube 133 ($A=1$, $(B+R)_n=1$), and tube 133 will also remain inoperative if $(B+R)_n=0$ regardless of whether A is then 0 or 1.

The D.C. plate potential of tube 130 is also applied to the suppressor grids of the two carry forming tubes 132' and 138 of the second operator circuit, addition and subtraction carry forming tubes. The control grid of tube 132' receives the positive pulses of the A train, delayed by $\theta/2$, from a resistance divider 154 which applies these pulses to the control grids of both the tubes 133' and 132'. By this arrangement, the coexistence in any code pulse period of a pulse in the A train and of a pulse in the $(B+R)_n$ train (as marked by the condition of the trigger stage 129—130 in the first operator circuit) initiates the formation of an addition carry pulse $R_{2a}$ provided tube 132' has been made operative by bistable trigger stage 40—41.

For a subtraction operation tube 138 is made operative and the control grid of this tube receives through conductor 153 the mixed voltage from resistance mixer 152, viz. the pulse voltage resulting from the mixing of the negative A train with the positive timing pulses, both having the above mentioned $\theta/2$ phase-shift. Actually, as apparent from the drawing, the control grids of both tubes 133 and 138 are connected in parallel to the output of mixer 152. Thus tube 138 will only form a subtraction carry pulse, when operative, in a code pulse period where $A=0$ and $(B+R)_n=1$, and will not form such a pulse when $A=1$ and $(B+R)_n=1$ or when $(B+R)_n=0$.

The rules of operation given in the table hereinbefore set out are thus also satisfied with the circuit arrangement of Fig. 6. It will be easy to check the operation of said Fig. 6 for the numerical example given in Fig. 2.

Figure 7:
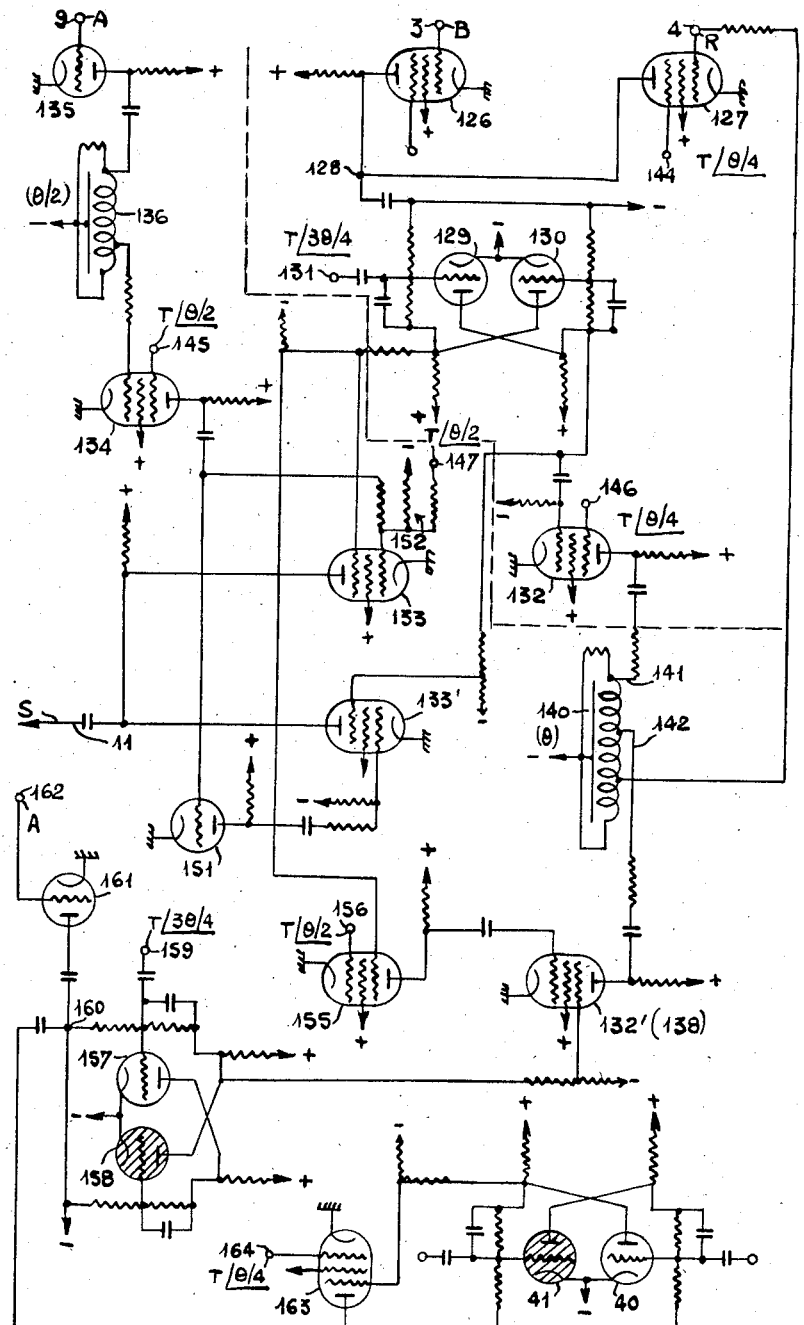

In the alternative embodiment of Fig. 7, a single tube 132' (138) is used for producing both the addition and the subtraction partial carry pulses in the second operator circuit. The control grid of this tube receives the timing pulses through an auxiliary tube 155 applied with a $\theta/2$ phase shift at 156 of tube 155. The suppressor grid of tube 155 is controlled by the plate output of tube 130 of trigger stage 129—130 in the first operator circuit; tube 155 only transmits the timing pulses when $(B+R)_n=1$, as required.

The suppressor grid of the tube 132'(138) receives the control voltage from the plate output of an auxiliary trigger stage 157—158, more precisely from the plate output of tube 158 of this auxiliary trigger stage which is conductive in the rest condition thereof. Carry-forming tube 132'(138) is only operative when trigger stage 157—158 is at work.

When the computer acts as an adding device trigger stage 157—158 only receives the pulse of coded input train A which is applied to its symmetrical actuation input 160, from input terminal 162 and through polarity inverter tube 161. Each time an A pulse is applied to actuation input 160, auxiliary trigger stage 157—158 is brought to work so that tube 132'(138) becomes operative at the instant $\theta/2$ of the particular code pulse period, and a carry pulse is formed if the tube 155 is operative ($A=1$, $(B+R)_n=1$). Reset timing pulses are permanently applied at the instance $3\theta/4$ of each code pulse period to asymmetrical reset input 159 of auxiliary trigger stage 157—158. The addition carries $R_{2a}$ are thus correctly derived.

When the computer acts as a subtracting device, additional actuation pulses are applied at the instants $\theta/4$ of each code pulse period to symmetrical actuation input 160. These additional pulses are delivered by a tube 163 which receives on its control grid the timing pulses applied at 164 applied with a phase shift of $\theta/4$ and which is rendered operative by the condition of trigger stage 40—41, controlling the bias of its suppressor grid. Thus, each time a pulse of the A train has set to work the trigger stage 157—158, a timing pulse from tube 163 resets the trigger stage to rest before any timing pulse applied at 156 with a phase shift of $\theta/2$ can reach the control grid of tube 132'(138) and no subtraction carry pulse $R_{2s}$ is produced. For $A=1$, if $(B+R)_n=1$, no carry pulse is formed, as required. On the other hand, if the timing pulse from tube 163 reaches the actuation input 160 in a code pulse period when no pulse exists in the A train, this timing pulse will bring to work the trigger stage 157—158 and tube 132'(138) will become operative at the instant $\theta/2$ of that code pulse period. A subtraction carry pulse $R_{2s}$ will be formed in this case which corresponds to $A=0$ and $(B+R)_n=1$.

Figure 8:
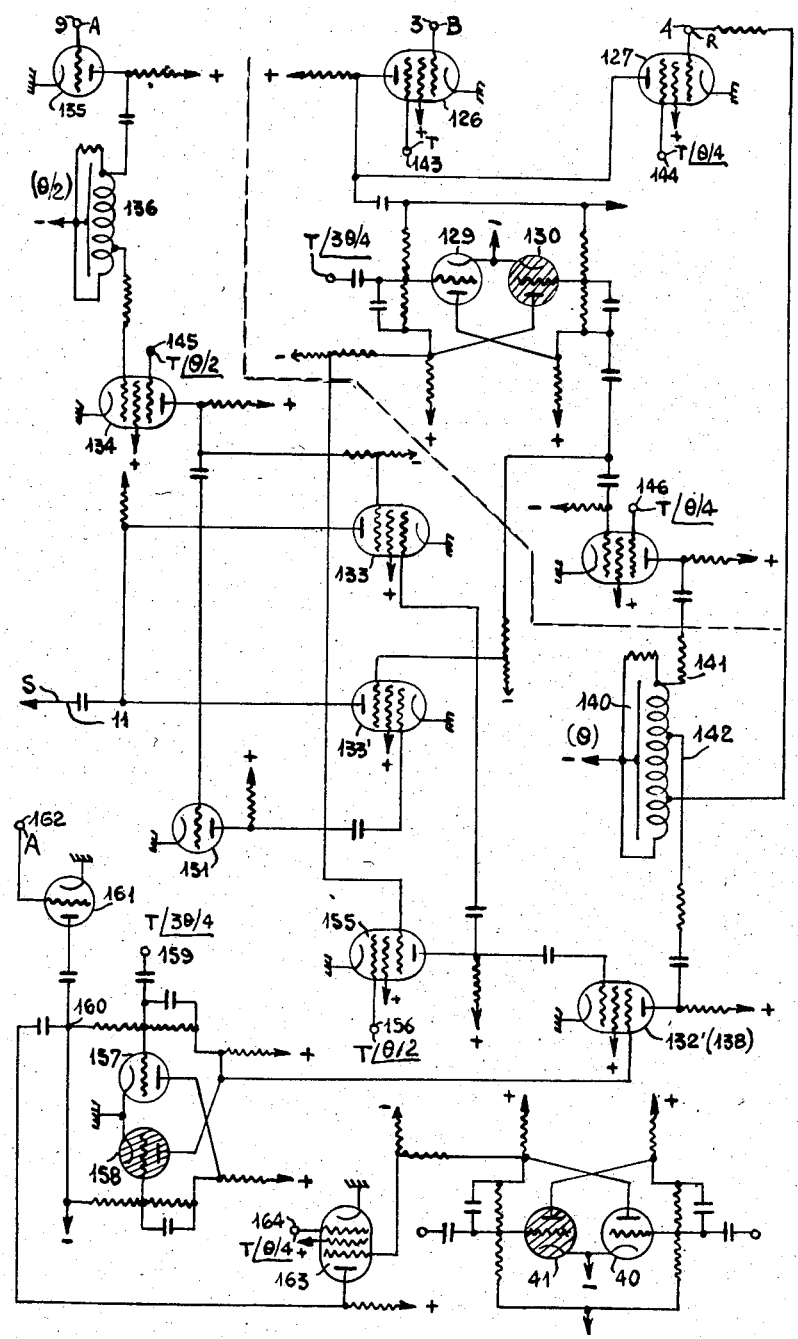

The same arrangement is retained in the alternative embodiment of Fig. 8, in which, however, the use of a resistance pulse mixer in the input of tube 133 is avoided. In Fig. 8 the control grid of input tube 133 is connected to the plate output of tube 155 which delivers a pulse whenever the condition $(B+R)_n=1$ is met in the first operator circuit. The operative condition of tube 133 is simply controlled by a D.C. connection from the plate output of tube 134 to its suppressor grid so that any existing pulse existing in the A train, shifted by $\theta/2$ and delivered in negative polarity from the plate output of tube 134, blocks tube 133 so that it does not transmit any timing pulse from tube 155 in this code pulse period. On the other hand, tube 133 will be operative to transmit such timing pulses to output terminal 11 whenever $A=0$ and $(B+R)_n=1$, since the timing pulse from terminal 156 is passed through tube 155 when $(B+R)_n=1$, i.e., when trigger stage 129—130 is at work.

If considered useful, instead of using shifted pulses from the A train for controlling the operative condition of output tube 133, recourse may be had to an auxiliary bistable trigger stage for such a control, such trigger stage being brought to work by existing A pulses and reset to rest by timing pulses applied with a phase shift, for example $3\theta/4$; the plate output of the trigger stage tube which is off in its rest condition would be connected to the suppressor grid of tube 133.

Figure 9:
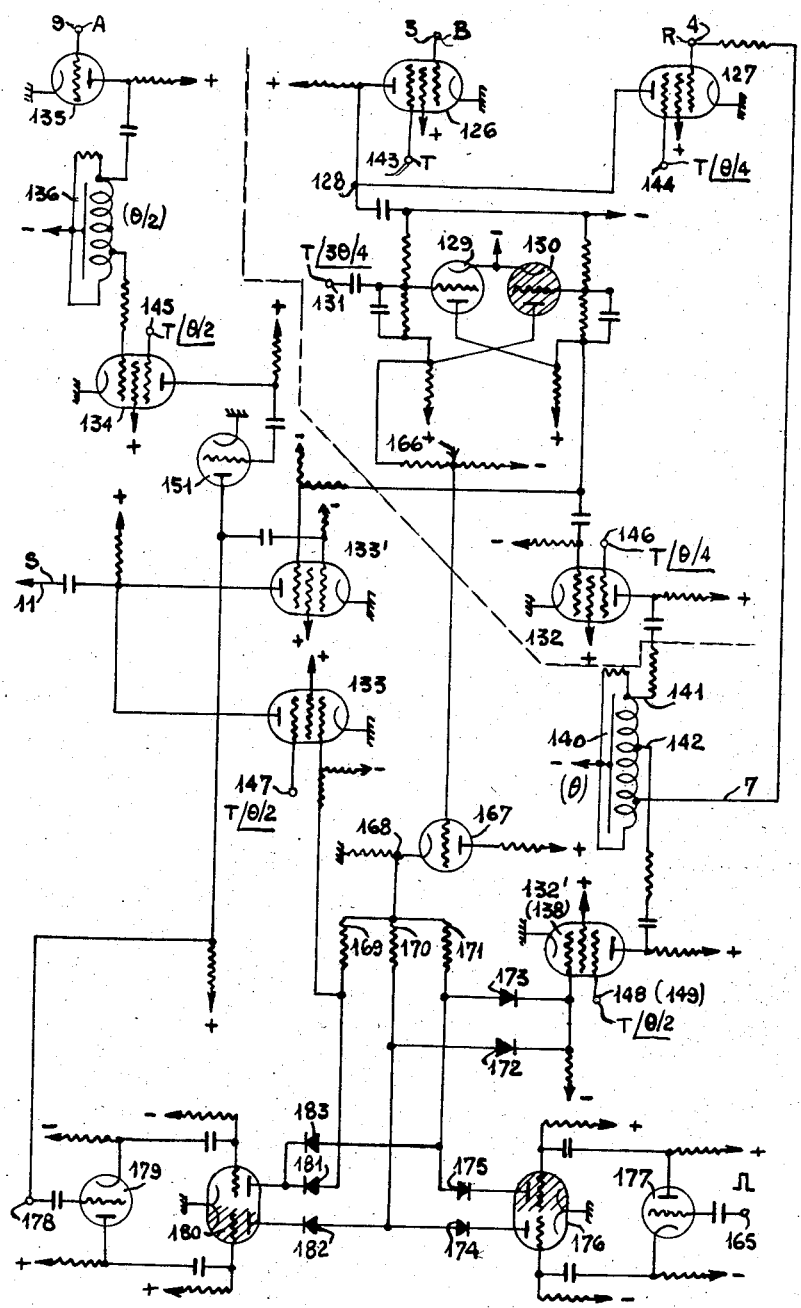

Another alternative embodiment is shown in Fig. 9 wherein the control circuit arrangement for both tubes 133 and 132'(138) differs from that shown in Fig. 8, the remaining component circuits being unchanged. The add-subtract control trigger stage 40—41 and the tube 163 of Fig. 8 are retained but not shown in Fig. 9, and it is to be understood that the plate output of tube 163 is connected to the input terminal 165 in Fig. 9, through an inverter stage not shown so that the timing pulses shifted by $\theta/2$ (instead of as in Fig. 8) delivered by tube 163 when operative appear with positive polarity at terminal 65.

Referring now to Fig. 9, the plate output of tube 130 of trigger stage 129—130 of the first operator circuit comprises a voltage divider 166 from which a conductor is connected to the control grid of a tube 167. When tube 130 is on, in the rest condition of the trigger stage, i.e. when $(B+R)_n=0$, the voltage applied to the control grid of tube 167 is practically zero, whereas it is relatively high when tube 130 is off, in the work condition of this trigger stage, i.e. when $(B+R)_n=1$.

Tube 167 is a cathodyne or cathode follower stage, having its output load in its cathode connection 168. The cathode load voltage is connected to a parallel resistance network 169—170—171. The other end of resistor 169 is connected to the control grid of output tube 133; the other end of resistor 170 is connected through a unidirectionally conductive element 172 to the control grid of tube 132' (138) as is also the other end of resistor 171 through a unidirectionally conductive element 173; such elements may advantageously be in the form of germanium crystals.

The control of the device to act either as an adding device or as a subtracting device is effected as follows: Through germanium crystals 174 and 175, the resistors 170 and 171 are respectively connected to the plates of the two triode elements of a double triode tube 176; one of these triodes is on and the other if off; their cathodes are jointly connected to ground. In the rest condition, as indicated, the lower triode is off and the upper one is on, and the ground is thus applied to resistor 171 through crystal 175.

Thus the control grid of the tube 132'(138) through the crystal 173 will be grounded when a voltage appears across the cathode load of the tube 167, being a voltage which indicates that trigger stage 129—130 has been set to work by a pulse in the $(B+R)_n$ pulse train. On the other hand, for these conditions, resistor 170 is ungrounded and the applied voltage is transmitted to the control grid of tube 132'(138). In this rest condition, the computer is set to act as an adding device.

When the timing pulses are applied to terminal 165, the computer will act as a subtracting device. At the instant $\theta/2$ of each code pulse period, the positive timing pulse is applied by terminal 165 to the control grid of a triode 177, the plate and cathode of which are respectively connected to the control grids of the triode elements of tube 176. When triode 177 is conductive, the upper triode element of tube 176 is off and the lower one is on. Resistor 170 is thus grounded and resistor 171 ungrounded.

Similar switching arrangement is also provided by means of pulses existing in the corresponding input train A supplied to input terminal 178 of the control grid of a triode tube 179 controlling the condition of another double triode 180, so that, in the absence of A pulses, the upper element of double triode 180 is off and the lower element is on. The plate of the lower element is connected through a crystal 182 to the end of resistor 170, and the plate of the upper element is similarly connected to resistors 169 and 171 through the crystals 181 and 183, respectively. Terminal 178 receives the coded input train A delayed by $\theta/2$ from the output of tube 151.

With the computer arrangement set for addition, no pulse being applied at control terminal 165, resistor 171 is grounded when no pulse exists during any code pulse period in the input train A and, if a voltage appears across the resistor at 168, indicating a condition $(B+R)_n=1$, then that voltage will be transmitted only to the control grid of the tube 133 through resistor 169 and no carry pulse will be formed since both resistors 170 and 171 are grounded.

If on the other hand a pulse from the coded input train A exists at the input terminal 178 and a voltage exists across the load 168 in the same code pulse period thus indicating the condition $A=1$, $(B+R)_n=1$, then resistor 169 is grounded but resistor 170 is not, and tube 132'(138) will thus deliver a carry pulse in its output.

With the computer arrangement set for subtracting, timing pulses being applied to terminal 165 during code pulse period, resistor 170 is grounded and resistor 171 is ungrounded at the instant $\theta/2$ of each code pulse period. When $A=0$ and $(B+R)=1$, a carry pulse is delivered by tube 132'(138) and simultaneously an output pulse is delivered by tube 133 since resistor 169 is ungrounded. When $A=1$ and $(B+R)=1$, the three resistors 169—170—171 are grounded and no pulse is delivered either into the carry channel or into the output channel. When $(B+R)=0$, no voltage appearing at 168, whether or not an A pulse is present, no such pulse is delivered either into the carry channel or into the output channel 11 from the tubes 132'(138) and 133, although the tube 133' will of course deliver a pulse to the output channel 11 if $A=1$ and $(B+R)_n=0$.

We claim:
1. In an electric computer device, comprising a first half-adder operator and a second half-adder operator, each having first and second actuation inputs, means in each of said operators for sequentially registering the input pulses received in said actuation inputs and means controlled from said registering means for forming from said input pulses a pulse train representing the logical function of restricted union, and second means controlled from said registering means for forming from said input pulses a gating pulse train, means for transferring the restricted union pulse train from the first operator to a first actuation input of the second operator, means including delaying means for transferring both gating pulse trains from the first and the second half-adder operators to a first actuation input of the first, an output channel, means for transferring the restricted union pulse train from the second operator to said output channel; and means for impressing signal pulse trains coded according to binary representation of two numerical quantities on the second actuation inputs of the first and second half-added operators, respectively.

2. An electric computer device according to claim 1, wherein said registering means comprise amplitude-discriminator means actuating a trigger circuit.

3. An electric computer device according to claim 1, wherein said registering means comprises impulse binary counting means.

4. An electric computer device comprising a first half-adder operator and a second half-adder operator, each having first and second actuation inputs and a plurality of outputs, said second half adder having an additional input, means in said first half-adder operator coupled to its actuation inputs and performing on its input pulse trains the logical function of restricted union for forming at two separate outputs restricted union pulse trains respectively representative of the net result of addition of said input trains and of the complement of said result of addition, gating means in said first half-adder operator for also deriving from its actuation inputs a gating pulse train representative of the carry-over quantity resulting fom said addition operation, transfer means from the restricted union output of said first operator representing said net result of addition to a first actuation input of said second half-adder operator, means in said second half-adder operator coupled to its actuation inputs and performing on its input pulse trains the function of restricted union for forming at two separate outputs restricted union pulse trains, one of the input pulse trains being the restricted union pulse train from the first half-adder operator representing the complementary result of addition; transfer means to introduce the complementary result of addition to the additional input of said second half adder operator, and gating means in said second half-adder operator for deriving from its actuation inputs a gating pulse train representative of the carry-over quantity resulting from the addition operation of its two input trains, gating means in said second half-adder operator for also deriving from its actuation inputs a gating pulse train representative of a subtraction operation between its input pulse trains, switching means for directing the one or the other of said gating pulse trains to a carry-over output of said second half-adder operator, delaying means having several inputs and an output, the latter being connected to a first actuation input of the first half-adder operator, transfer means for applying both the gating pulse train from the first operator and the selected gating pulse train in said second operator to respective inputs of said delaying means, and transfer means for applying on the second actuation inputs of said first and second half-adder operators respectively signal pulse trains coded according to the binary representation of two numerical quantities.

5. An electric computer device according to claim 4 comprising means in said first operator for producing a gating pulse train representative of the complement of the addition carry-over pulse train wherein said gating means for deriving a subtraction carry-over pulse train are operatively controlled both by the gating pulse train from the first operator representative of said complement of the addition carry-over train and by the numerical quantity representative signal train applied on said second half-adder operator.

6. An electric computer device according to claim 4, wherein said gating means for deriving a subtraction carry-over pulse train are operatively controlled by both the additional result pulse train from the first half-adder operator and the addition carry-over gating pulse train in said second half-adder operator.

7. An electric computer device according to claim 4, comprising means in said second operator for producing a pulse train complementary to the signal pulse train representing the numerical quantity and wherein said gating means for deriving a subtraction carry-over pulse train are operatively contolled by both the addition result pulse train from the first half-adder operator and said complementary train of the signal pulse train representing the numerical quantity in said second half-adder operator.

8. In an electric computer device, first half-adder operator and a second half-adder operator, each operator including first and second actuation inputs and output terminals, including a first actuation input for receiving a coded signal train of binary number representative pulses; said first half-adder operator including gating means coupled to its actuation inputs and means coupled to its actuation inputs and for performing on the input pulse trains the logical function of restricted union for simultaneously deriving from said input pulse trains an addition carryover pulse train and a corrected addition result pulse train, respectively, said restricted union means in said first operator being connected at least to a first output terminal of said first operator; said second half-adder operator including input gating means and means for performing on the incoming pulse trains the logical function of restricted union for selectively deriving from said input pulse trains addition or subtraction carryover pulse trains as well as a corrected result pulse train, respectively; an output terminal from said restricted union means in said second operator being coupled to a second actuation input in said first operator, second output terminal in said second operator, and a control switch in said second operator for passing only one or or the other of said carryover pulse trains to said second output terminal, delaying means connecting a second actuation input of said second operator to both the second output terminals of said first and second operators.

References Cited in the file of this patent

UNITED STATES PATENTS

| | | |
|---|---|---|
| 2,590,950 | Eckert | Apr. 1, 1952 |
| 2,596,199 | Bennett | May 13, 1952 |
| 2,600,744 | Eckert | June 17, 1952 |
| 2,643,820 | Williams | June 30, 1953 |
| 2,646,501 | Eckert | July 21, 1953 |
| 2,803,401 | Nelson | Aug. 20, 1957 |
| 2,808,983 | Uttley | Oct. 8, 1957 |

FOREIGN PATENTS

| | | |
|---|---|---|
| 1,008,424 | France | Feb. 20, 1952 |
| 1,029,204 | France | Mar. 4, 1953 |
| 707,784 | Great Britain | Apr. 1, 1954 |

OTHER REFERENCES

Calculating Instruments and Machines by Hartree, Univ. of Ill. Press, 1949; pages 103–106, total of three sheets.

Proceedings of the IRE, "Standards on Electronic Computers; Definitions of Terms," 1950; pages 271–277. Page 272 relied on. March 1951.

Proceedings of the Institute of Electrical Engineers. Part II April 1952. Pages 107–123.